(12) United States Patent
Januschevski et al.

(10) Patent No.: US 9,045,046 B2
(45) Date of Patent: Jun. 2, 2015

(54) ELECTRICAL CHARGING SYSTEM

(75) Inventors: Robert Januschevski, Tettnang (DE); Jurgen Kett, Mannheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 421 days.

(21) Appl. No.: 13/469,308

(22) Filed: May 11, 2012

(65) Prior Publication Data
US 2012/0299543 A1 Nov. 29, 2012

(30) Foreign Application Priority Data
May 27, 2011 (DE) .......................... 10 2011 076 599

(51) Int. Cl.
*H02J 7/00* (2006.01)
*B60L 11/18* (2006.01)

(52) U.S. Cl.
CPC ......... *B60L 11/1811* (2013.01); *B60L 11/1812* (2013.01); *B60L 2220/54* (2013.01); *Y02T 10/7005* (2013.01); *Y02T 10/7094* (2013.01); *Y02T 10/641* (2013.01); *Y02T 90/14* (2013.01); *Y02T 90/127* (2013.01)

(58) Field of Classification Search
USPC ................................................. 320/104, 109
See application file for complete search history.

(56) References Cited

U.S. PATENT DOCUMENTS

| 5,629,603 A | 5/1997 | Kinoshita |
| 8,242,739 B2* | 8/2012 | Krauer et al. ................. 320/107 |
| 2012/0176084 A1* | 7/2012 | Klaes ............................. 320/107 |
| 2013/0069492 A1* | 3/2013 | Rippel et al. ................ 310/68 D |

FOREIGN PATENT DOCUMENTS

| DE | 41 07 391 A1 | 9/1992 |
| DE | 693 03 150 T2 | 2/1997 |
| DE | 10 2009 028 959 A1 | 3/2011 |
| DE | 10 2009 052 680 A1 | 5/2011 |
| EP | 0 834 977 A2 | 4/1998 |

* cited by examiner

*Primary Examiner* — Eric Lee
(74) *Attorney, Agent, or Firm* — Davis & Bujold, PLLC; Michael J. Bujold

(57) ABSTRACT

An electrical charging system for an energy accumulator of a motor vehicle. The electrical charging system comprises a supply input in a conductor system having at least one phase conductor and a neutral line for energy supply from a grid. The charging system also comprises a rotating field machine which, via its phase windings, is operably connected to a rectifier. The rectifier is provided on the other side for connection to the energy accumulator to be charged, the phase windings of the rotating field machine can be either selectively isolated and interconnected such that the charging system is designed for step-up connecter charging operation and step-down charging operation by way of at least one isolated phase winding and, in particular, all the isolated phase windings.

19 Claims, 1 Drawing Sheet

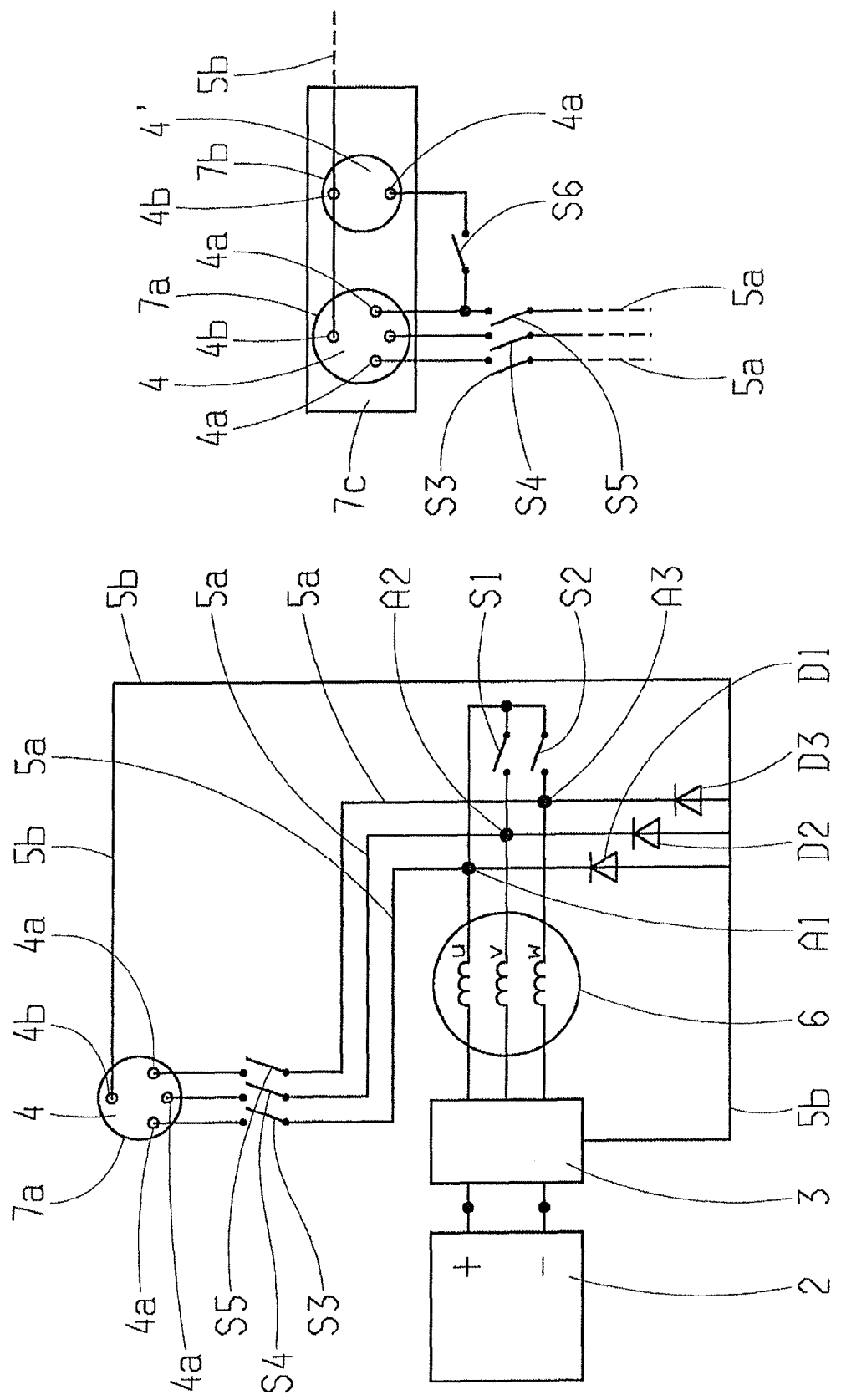

ELECTRICAL CHARGING SYSTEM

This application claims priority from German patent application serial no. 10 2011 076 599.9 filed May 27, 2011.

FIELD OF THE INVENTION

The present invention concerns an electrical charging system.

BACKGROUND OF THE INVENTION

For charging energy accumulators in motor vehicles, for example in the form of traction batteries such as those in hybrid or electric vehicles, besides external charging units on-board charging units are also used, which advantageously make use of the specific on-board infrastructure of the electric drive-train.

The document DE 693 03 150 T2 discloses a system in which a selectively switchable main voltage source charges an energy accumulator by way of a rotating field machine and a rectifier. The document EP 0 834 977 A2 in addition discloses a charging device in which the inductances of the electric machine can advantageously be used to form a step-up converter for setting the charging voltage.

SUMMARY OF THE INVENTION

Starting from there the purpose of the present invention is to propose a charging system which, while retaining the advantages of the prior art, provides farther-reaching charging possibilities with little cost and complexity.

According to the invention an electrical charging system is proposed for an energy accumulator of a motor vehicle. In this case the charging system is in particular designed as an on-board charging system, which can be realized by means of a vehicle-specific electric drive infrastructure, for example that of a hybridized motor vehicle or an electric vehicle.

The charging system comprises a supply input in a conductor system having at least one phase conductor and one zero or neutral conductor for energy supply from a power grid, the neutral conductor preferably being grounded. The supply input can be a three-phase input in a four-conductor system with one neutral line and three phase lines. The supply input can also be an alternating current input, for example part of a single-phase system with a phase line and a neutral line.

In the context of the present invention an active phase line is said to be a phase line by way of which energy is transported instantaneously from a power grid.

In the context of the present invention, in a preferred embodiment it is provided that the charging system is formed with a first and a second supply input, such that it is possible to switch between the first and the second supply inputs, i.e. the supply input is formed selectively either by the first or by the second supply unit. In this case the first supply input has a first number of phase lines while the second supply input has a second number of phase lines different from the first number. The first supply input is in particular a three-phase input with three phase lines and the second supply input is an alternating current input with one phase line. This enables for example both alternating and three-phase sources to be connected to the charging system for energy supply, for example ones with 230 V and also 400 V.

A supply input of the charging system is preferably formed by a connecting device in the form of a plug connection, which for example can be a plug or a socket.

The charging system is preferably designed such that all the phase lines of a particular supply input can be used as active phase lines for the input of energy, i.e. designed to correspond with that one of a plurality of connectable conductor systems which has the most phase lines. Preferably, in the context of the present invention the charging system is multi-phased, in particular a three-phase system, in order to enable multi-phase charging operation for example using three-phase current. In a preferred embodiment such a charging system can, in a simple manner, advantageously also be used for a single-phase charging operation using alternating current.

In the context of the present invention the charging system comprises a rotating field machine which, by way of its phase windings, is connected to a drive inverter of the charging system, i.e. electrically so. In this case operation of the rotating field machine, particularly for drive purposes, can take place by means of the inverter for example by suitable cycling of the switches thereof. In a known way the inverter is formed by a bridge circuit, the rotating field machine is preferably designed as a star circuit and in relation to the inverter is arranged on the alternating voltage side thereof. A control system controls the operation of the inverter by means of a driver stage thereof.

On the other side, i.e. on the direct voltage side, the inverter can be connected, i.e. electrically, to an energy accumulator to be charged by the charging system, preferably via an intermediate circuit condenser of the inverter. Here, the energy accumulator can be a battery consisting of one or more cells, an accumulator, a high-power condenser, or some other energy accumulator that can be charged and is suitable for driving purposes.

In the context of the present invention the phase windings of the rotating field machine can be electrically selectively isolated or combined, i.e. the electrical interconnection of the phase windings with one another—corresponding for example to a star-circuit—can be released and re-formed. Isolation produces discrete current paths through the rotating field machine, in each case via one phase winding thereof, while combination restores the interconnection which serves the original driving purpose. For this, the windings of the rotating field machine can preferably be isolated or combined selectively by switches, for example designed as separating switches (referred to as second switches in what follows).

At least one of the phase conductors of the supply input, by means of which energy can be transported on connection to a supply grid via the connecting device, is in the context of the present invention connected to the neutral line of the supply input via a switch, or a first switch, and a diode connected in its blocking direction. Such a first switch is preferably a controllable transistorized switch that can be operated with cycling, such as an IGBT or a MOSFET. In this case the electrical connection of the at least one phase conductor to the neutral line passes respectively through the switching path of the switch, e.g. drain source. The respective diode in the line segment between the phase conductor and the neutral line of the supply input is provided for freewheel operation, as will be explained in more detail later, and is connected in series with the switch or its switching path.

In this case an electrically isolated phase winding, i.e. of the rotating field machine, can be selectively connected, i.e. electrically, via a tap between the first switch and the diode, by means of the same switch to the phase conductor of the supply input. On the other side the inverter is electrically connected to the neutral line.

The connection between a phase conductor and the neutral line can be formed in particular by a connecting line extending from the phase conductor to the neutral line. By virtue of this advantageous arrangement which can be produced with little cost and effort, a charging system with comprehensive, at least single-phase charging regulation possibilities for charging operation, for example with alternating current supplied on the input side, is produced.

In a particularly preferred embodiment a plurality and in particular all the phase conductors of a particular, especially a connectable supply input can be connected, in each case via a first switch and in each case via a diode connected in the blocking direction, to the neutral line of the supply input. For this the charging system preferably comprises a number of first switches, diodes and connecting lines that corresponds to the largest number of phase conductors in the respective supply inputs, i.e. three in the case of three-phase current, this being the supply input with the largest number of phase conductors. In this preferred embodiment several, in particular all the electrically isolated phase windings, in particular all three, can be connected in each case via a tap between a first switch and a diode, by means of the switch, selectively to a respective phase conductor. This advantageous and easily implemented arrangement provides a motor vehicle charging system with comprehensive, in particular multi-phase charging regulation possibilities for charging operation. In particular, a three-phase charging operation can be carried out thereby.

In a preferred embodiment of the invention it is provided that by means of an isolated phase winding of the rotating field machine, at least one first switch and at least one diode, a step-down converter that acts in the direction toward the energy accumulator is formed. Such a one can work as at least a single-phase step-down converter, for example in connection with an alternating current supply from the supply input. To form the step-down converter, advantageously the winding inductance of the isolated phase winding is used.

In particular, here it is also provided, by means of the charging system and using a plurality, especially all of the isolated phase windings of the rotating field machine, and using a plurality of switches and a plurality of diodes, to form a multi-phase step-down converter acting in the direction toward the energy accumulator. Such a one can for example work in connection with a four-conductor system supply input as a three-phase step-down converter. To form the step-down converter, advantageously the respective winding inductance of an isolated phase winding is used for intermediate energy storage in accordance with the step-down converter principle.

In the context of the present invention the charging system is in particular also designed, by means of at least one isolated phase winding of the rotating field machine, a first switch and the rectifier, to form a step-up converter acting in the direction toward the energy accumulator. The step-up converter so formed is for example used in connection with a conductor system having one phase conductor. In this case a first switch that connects the active phase conductor via an associated tap to the isolated phase winding is closed, or conducting, to form the step-up converter.

In a preferred embodiment, by means of a plurality and in particular all the phase windings of the rotating field machine, a plurality of first switches and the rectifier, the charging system forms a multi-phase step-up converter acting in the direction toward the energy accumulator. In this case an inductance of an isolated phase winding can advantageously be used to increase the voltage in accordance with the step-up converter principle. Here, the supply input is for example a three-phase input or a multi-conductor input. To form the step-up converter, the first switches, in each case connected via a tap to an isolated phase winding, are preferably closed.

As explained earlier, in the context of the present invention a charging system that is advantageously simple to produce is provided, which is designed for step-up converter charging operation and also step-down converter charging operation by means of at least one isolated phase winding and in particular all the isolated phase windings.

In a method according to the invention for operating the charging system, a first or step-down converter operating mode is provided. In this case the charging system acts as a step-down converter in the direction toward the energy accumulator. For the step-down converter operation, a first switch arranged in an active phase conductor can be operated in cycles, preferably all the first switches arranged in active phase conductors, such that the phase winding connected to the respective switch via the associated tap is in each case electrically isolated and such that the rectifier works in loop-through operation, i.e. the charging current is looped through to the energy accumulator by the inverter.

In the method for operating a charging system it is also proposed to operate this in a second, or step-up converter mode. In the step-up converter operating mode, the charging system acts as a step-up converter in the direction toward the energy accumulator. For this, a first switch arranged in an active phase conductor can be closed for a time, in particular all the first switches arranged in active phase conductors, whereby the phase winding connected to the respective switch via the associated tap is in each case electrically isolated and whereby the operation of the inverter is cycled.

In a method for operating a charging system, the charging system is operated in a third, or a further charging operation mode. In this case the charging system again works in a charging mode such that at least one first switch arranged in an active phase conductor is cycled, in particular all of them, and such that the phase winding connected to the switch via the associated tap is electrically isolated and the inverter is operated in a cyclic manner. By virtue of this mode of operation charging regulation can also be achieved when the supply voltage corresponds to the voltage at the energy accumulator, for example being approximately identical thereto. In this case the charging system can act on the one hand as a step-up converter and on the other hand at the same time as a step-down converter. In this third operating mode it is provided that the first switches are cycled with a frequency corresponding to the cycling frequency of the inverter.

Further characteristics and advantages of the invention emerge from the following description of example embodiments of the invention, given with reference to the figures in the drawings, which show details essential to the invention, and from the claims. The individual characteristics can in each case be implemented individually as such or several at a time in any desired combination in variants of the invention.

BRIEF DESCRIPTION OF THE DRAWINGS

Below, example embodiments of the invention are explained in more detail with reference to the attached drawings, which show:

FIG. 1: An example of an electrical charging system according to a possible embodiment of the invention; and FIG. 2: Examples of two supply inputs of the charging system, between which it can be switched, according to another possible embodiment of the invention.

DETAILED DESCRIPTION OF THE PREFERRED EMBODIMENTS

FIG. 1 shows an example of an electrical charging system 1 for charging an electrical energy accumulator 2 in the form of a traction battery, which can be charged by way of an inverter 3 of the charging system 1. On its direct voltage side the energy accumulator 2 is connected to the inverter 3, in particular for example via an intermediate circuit condenser. The charging system 1 is designed as an on-board charging system of a motor vehicle.

The charging system 1 comprises a supply input 4 for drawing energy from an external three-phase energy supply grid. In this case the supply input 4 has three phase conductors 4a and one neutral line 4b or neutral conductor. The inverter 3 is electrically connected to the neutral line 4b, in this case by means of the line 5b, so that a reference potential is available for the inverter 3.

The three phase conductors 4a of the supply input 4 are respectively connected electrically via a first switch S3, S4, S5 of the charging system 1 and in each case a diode D1, D2, D3 connected in the blocking direction, to the neutral line 4b thereof. The switching path of each first switch S3, S4, S5 is here arranged in series with a respective diode D1 or D2 or D3 connected in its blocking direction, whose electrical input is formed in each case by a phase conductor and whose electrical output is formed by the neutral line 4b, i.e. by the potential line 5b.

Such a connection, in particular all those which are respectively formed by a connecting line 5a and which in each case pass via the switching path of a first switch S3, S4, S5, has a respective tap A1, A2, A3 between the switch S3, S4, S5 concerned and the respective diode D1 or D2 or D3. As already indicated, to connect the ends of the connection lines 5a to the neutral line 4b, the potential line 5b starting from the neutral line 4b is also used, the inverter 3 also being connected thereto.

On the alternating current side, the inverter 3 is connected by means of its windings to a rotating field machine 6 of the charging system 1, the windings u, v, w being in star connection for driving purposes. The windings u, v, w can be isolated by means of second switches S1, S2 of the charging system 1, in particular electrically so. When the switches S1, S2 are opened the star connection of the windings u, v, w is broken and when they are closed it is re-made again. By means of a tap A1 or A2 or A3, an isolated winding u, v, w can be connected to a phase conductor 4a of the supply input 4 in a selective manner, i.e. depending on the switch position of the associated, or electrically coupled first switch S3, S4, S5.

The charging system 1 is designed so as to be able, during charging operation, to adjust appropriately the charging voltage for the energy accumulator 2 to be charged. For this, the charging system 1 can advantageously operate as a step-up and/or step-down converter, i.e. in the direction toward the energy accumulator 2 to be charged.

For step-down converter operation—corresponding to a voltage reduction in the direction toward an energy accumulator 2 to be charged—the second switches S1, S2 are opened and the phase windings u, v, w are thereby isolated. In this case the rotating current machine 6—in particular in the form of an asynchronous machine—is out of operation. From the supply input 4, energy supplied via the active phase conductor 4a and the zero line 4b can be passed, by closing the appropriate first switch S3, S4, S5, to the respective tap A1, A2, A3 for an isolated winding u or v or w, so that by virtue of the respective phase, inductance energy can be stored intermediately therein. A charging current for the energy accumulator 2 can reach the energy accumulator by way, respectively, of a phase winding u, v, w connected to a tap A1, A2, A3 via the inverter 3, the latter operating in a loop-through mode.

To adjust the charging voltage level, the switch S3, S4 S5 concerned, connected to the tap A1 or A2 or A3 respectively by its switching path, is operated cyclically, i.e. by controlling its respective control input. When a switch S3, S4, S5 is opened, an isolated phase inductance of a winding u, v, w can, via the respective diode, D1, D2, D3 and the inverter connected thereto, pass the current on via the load and the neutral line or circulate the current, i.e. in charging operation the charging system 1 acts as a step-down converter. To form a three-phase step-down converter (see FIG. 1) the three phase conductors 4a of the multi-phase conductor system have to be connected, each via a corresponding tap A1, A2, A3 between a first switch S3, S4, S5 and a diode D1, D2, D3, to an isolated phase winding u, v, w and all the first switches S3, S4, S5 have to be operated in a controlled or cycled manner.

To increase the charging voltage, for example when the supply voltage level from the supply grid is low, for example when energy is drawn from an alternating voltage grid, the charging system 1 can form a step-up converter. In this case the phase windings u, v, w are again isolated by means of the second switches S1, S2. The inverter 3 is operated cyclically, such that at least one switch S3, S4, S5 connected to an active phase conductor is closed at all times. A respective isolated phase winding u, v, w connected via a tap A1, A2, A3 to the supply input 4 provides an inductance for increasing the voltage or for forming the step-up converter.

FIG. 2 shows a first supply input 4 and a second supply input 4' of a preferred embodiment of a charging system 1, such that in this case the charging system 1 can be switched between the first 4 and the second 4' supply input. Each of the supply inputs 4, 4' is formed by a respective connection device 7a, or 7b, such that the three-phase input 4 is formed by a three-phase current connector 7a having three phase conductors 4a and a neutral line 4b for connection to a three-phase grid, and the alternating current input 4' is formed by an alternating current connector 7b with one phase conductor 4a and a neutral line 4b for connection to an alternating current grid. The connection devices 7a, 7b are preferably integrated in a common switch array and the neutral line 4b is preferably combined with the potential line 5b.

To switch over between a three-phase and an alternating current energy supply, a third switch S6 is connected between the phase conductor 4a of the supply input 4' and a connecting line 4a of the supply input 4, which can selectively connect them electrically.

If an external three-phase source is provided for a charging operation, the first supply input 4 is connected to it by means of the connection device 7a, with the third switch S6 open and the alternating current input 4' therefore electrically separated or disconnected from the connecting lines 5a. Thus, charging operation takes place exclusively via the three-phase input 4 by means of the three active phase conductors 4a of the three-phase input 4.

For a charging operation by means of an external alternating current grid, the second supply input 4' is connected via its connector device 7b to the alternating current grid. The first switches S3 and S4 do not function, for example they are open, while the switches S5 and S6 are closed, i.e. switched to conduct. With this switch setting of the first switch S5 and the third switch S6, the phase of the alternating current input 4' can be electrically connected to a connecting line 5a, i.e. that of the first switch S5 in FIG. 2. A charging operation thus takes place exclusively by means of the alternating current input 4' via an active phase conductor 4a thereof.

Accordingly, the charging system 1 enables a charging operation both from an alternating current grid and from a three-phase grid, in particular with simple means for switching between alternating and three-phase current supply.

The one among the first switches S3, S4, S5 whose phase conductor 4a is electrically connected to the switch S6, in this case the switch S5, can work in both the alternating current charging operation mode and the three-phase charging operation mode as described earlier, in step-up and/or step-down converter operation. The neutral line 4b of the alternating current and three-phase current inputs 4, 4' is in this case, for example, designed as a common neutral line 4b.

INDEXES

1 Charging system
2 Energy accumulator
3 Inverter
4 Supply input
4' Further supply input
4a Phase conductor
4b Zero conductor or neutral line
5a Connecting line
5b Potential line
6 Rotating field machine
7a Three-phase connection device
7b Alternating current connection device
7c Terminal field
S1, S2 Second switches
S3, S4, S5 First switches
S6 Third switch
D1, D2, D3 Diodes
A1, A2, A3 Taps

The invention claimed is:

1. An electrical charging system (1) for an energy accumulator (2) of a motor vehicle, the electrical charging system (1) comprising:
 a supply input (4, 4') in a conductor system having at least one phase conductor (4a) and a neutral line (4b) for energy supply from a power grid,
 the charging system (1) also comprising a rotating field machine (6) which, via phase windings (u, v, w), being operably connected thereby to a first side of an inverter (3), wherein the inverter is controlled by a control system,
 a second side of the inverter (3) being operably connected to the energy accumulator (2) to be charged,
 the phase windings (u, v, w) of the rotating field machine (6) being either selectively isolated or interconnected,
 a potential line (5b) electrically connecting the neutral line (4b) of the supply input (4) to the inverter (3) via an electrical pathway which bypasses the phase windings (u, v, w), and
 the charging system (1) being designed, by at least one isolated phase winding (u, v, w), for one of a step-up connecter charging operation and a step-down charging operation.

2. The charging system according to claim 1, wherein the at least one phase conductor (4a) of the supply input (4, 4') is connected, via a first switch (S3, S4, S5) and a diode (D1, D2, D3) connected in a blocking direction, to the neutral line (4b) of the supply input (4, 4'), and the electrically isolated phase winding (u, v, w) is selectively connected to the conductor (4a) of the supply input (4, 4') by way of a tap (A1, A2, A3) between the first switch (S3, S4, S5) and the diode (D1, D2, D3) by the first switch (S3, S4, S5).

3. The charging system (1) according to claim 2, wherein the diode (D1, D2, D3) is located exterior of the inverter (3) and electrically couples the tap (A1, A2, A3) with the potential line (5b).

4. The charging system (1) according to claim 1, wherein the charging system comprises a first supply input (4) with a first number of phase conductors (4a), and a second supply input (4') with a second number of phase conductors (4a), which are selectively switched between the energy supply from the power grid.

5. The charging system (1) according to claim 4, wherein for switching between the first supply input (4) and the second supply input (4'), at least one of first switch (S3, S4, S5) and a third switch (S6) is provided.

6. The charging system (1) according to claim 1, wherein several phase conductors (4a) of the respective supply input (4, 4') are connectable, in each case by way of a first switch (S3, S4, S5) and a diode (D1, D2, D3) connected in a blocking direction, to the neutral line (4b) of the supply input (4, 4'), such that several of the electrically isolated phase windings (u, v, w) are selectively connected, in each case by way of a tap (A1, A2, A3) between the first switch (S3, S4, S5) and the diode (D1, D2, D3), by the respective first switch (S3, S4, S5), to a respective one of the several phase conductors (4a).

7. The charging system (1) according to claim 1, wherein the supply input (4, 4') is at least one of a three-phase input (7a) and an alternating current input (7b), the three-phase input (7a) has three phase conductors (4a), and the alternating current input (7b) with one phase conductor (4a).

8. The charging system (1) according to claim 1, wherein a step-down converter, acting in a direction toward the energy accumulator (2), is formed by the at least one isolated phase winding (u, v, w) of the rotating field machine (6), a first switch (S3, S4, S5) connected thereto via a tap (A1, A2, A3) and a diode (D1, D2, D3) connected thereto via the tap (A1, A2, A3).

9. The charging system (1) according to claim 1, wherein a step-up converter, acting in a direction toward the energy accumulator (2), is formed by the at least one isolated phase winding (u, v, w) of the rotating field machine (6), a first switch (S3, S4, S5) connected thereto via a tap (A1, A2, A3) and the inverter (3).

10. The charging system (1) according to claim 1, wherein the phase windings (u, v, w) of the rotating field machine (6) are either isolated or interconnected by second switches (S1, S2).

11. The charging system (1) according to claim 1, wherein the at least one phase conductor (4a) of a respective supply input (4, 4') are, in each case, connected by way of a connecting line (5a) to the neutral line (4b) and each connecting line (5a) comprises a first switch (S3, S4, S5) and a diode (D1, D2, D3), a tap (A1, A2, A3) is formed, in each case, between the first switch (S3, S4, S5) and the diode (D1, D2, D3) for an isolated phase winding (u, v, w).

12. The charging system (1) according to claim 1, wherein the electrical connection of the potential line (5b), between the neutral line (4b) of the supply input (4) and the inverter (3), bypasses at least a first switch (S3, S4, S5) that electrically couples the windings (u, v, w) with the at least one phase conductor (4a).

13. The charging system (1) according to claim 1, wherein the electrical connection of the potential line (5b), between the neutral line (4b) of the supply input (4) and the inverter (3), bypasses each first switch (S3, S4, S5) that electrically couples the windings (u, v, w) with the at least one phase conductor (4a).

14. The charging system (1) according to claim 1, wherein the potential line directly electrically connects the neutral line (4b) of the supply input to the inverter (3).

15. A method for operating a charging system (1) comprising a supply input (4, 4') in a conductor system having at least one phase conductor (4a) and a neutral line (4b) for receiving energy supply from a power grid, the charging system (1) also comprising a rotating field machine (6) which, via phase windings (u, v, w) being operably connected thereby on a first side to an inverter (3), wherein the inverter is controlled by a control system, the inverter (3) being connected on a second side to the energy accumulator (2) to be charged, a potential line (5b) electrically connecting the neutral line (4b) of the supply input (4) to the inverter (3) via an electrical pathway which bypasses the phase windings (u, v, w), and the phase windings (u, v, w) of the rotating field machine (6) being either selectively isolated or interconnected, and the charging system (1) being designed for step-up connecter charging operation and for step-down charging operation by at least one isolated phase winding (u, v, w), the method comprising the steps of:

cyclically operating at least one first switch (S3, S4, S5) arranged in the active phase conductor (4a), in a first, step-down converter operating mode of the charging system (1), in which the charging system (1) acts as a step-down converter in a direction toward an energy accumulator (2); and respectively electrically isolating the phase winding (u, v, w) connected to the first switch (S3, S4, S5), via an associated tap (A1, A2, A3), such that the inverter (3) works in a loop-through operating mode.

16. The method for operating a charging system (1) according to claim 15, further comprising the step of closing the at least one first switch (S3, S4, S5), arranged in the active phase conductor (4a) in a second, step-up converter operating mode of the charging system (1), in which the charging system (1) acts as a step-up converter in the direction toward the energy accumulator (2), the phase winding (u, v, w) connected to the first switch (S3, S4, S5) via the associated tap (A1, A2, A3) is in each case electrically isolated and the inverter (3) is operated cyclically.

17. The method for operating a charging system (1) according to claim 15, further comprising the step of cyclically operating at least one first switch (S3, S4, S5) arranged in the active phase conductor (4a) in a third charging operation mode of the charging system (1), in which the charging system (1) works in a charging operation, the phase winding (u, v, w) connected to the first switch (S3, S4, S5) via the associated tap (A1, A2, A3) is, in each case, electrically isolated and the inverter (3) is operated cyclically.

18. The method according to claim 17, further comprising the step of cycling the at least one first switch (S3, S4, S5) with a frequency that corresponds to a cycling frequency of the inverter (3).

19. A motor vehicle in combination with a charging system (1) for an energy accumulator (2) of a motor vehicle, the electrical charging system (1) comprising:

a supply input (4, 4') in a conductor system having at least one phase conductor (4a) and a neutral line (4b) for energy supply from a power grid, the charging system (1) also comprising a rotating field machine (6) which, via phase windings (u, v, w), being operably connected thereby to a first side of an inverter (3), wherein the inverter is controlled by a control system, the inverter (3) being operably connected on a second side to the energy accumulator (2) to be charged, a potential line (5b) electrically connecting the neutral line (4b) of the supply input (4) to the inverter (3) via an electrical pathway which bypasss the phase windings (u, v, w), the phase windings (u, v, w) of the rotating field machine (6) being either selectively isolated or interconnected, and the charging system (1) being designed for step-up connecter charging operation and for step-down charging operation by at least one isolated phase winding (u, v, w).

* * * * *